Figure 1:
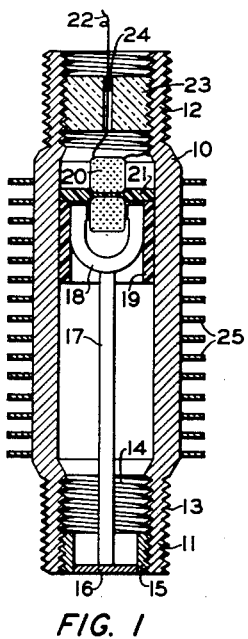

June 9, 1953  M. M. ADAMS  2,641,719

DETONATION METER PICKUP

Filed July 25, 1949

INVENTOR.
M. M. ADAMS

BY Hudson & Young
by: L. Malcolm Oberlin

ATTORNEYS

Patented June 9, 1953

2,641,719

UNITED STATES PATENT OFFICE 2,641,719

DETONATION METER PICKUP

Max M. Adams, Bartlesville, Okla., assignor to Phillips Petroleum Company, a corporation of Delaware Application July 25, 1949, Serial No. 106,586

6 Claims. (Cl. 310—25)

This invention relates to a detonation meter pickup for converting pressure variations in a cylinder of an internal combustion engine to electrical voltages representative thereof.

Heretofore, in measuring detonation in a cylinder of an internal combustion engine, a pickup of the magnetostrictive type has been utilized to provide electrical voltages representative of the cylinder pressure variations. Such pickups ordinarily comprise a rod of magnetostrictive material having a coil wound thereon, this rod being moved responsive to the pressure variations in the cylinder by a diaphragm attached to the rod, this diaphragm either communicating with the interior of the cylinder or being mounted on the engine block adjacent the cylinder. Magnetostrictive pickups of this type provide a reliable measurement of the cylinder pressure variations by the electrical voltages produced but they have the serious disadvantage that frequent failures occur with resultant expense and inconvenience to the user of the pickup. The most common cause of failure is an open circuit in the coil which is attached directly to the magnetostrictive member and, thus, is subjected to constant mechanical stresses during vibration of the magnetostrictive member.

In accordance with the present invention, the magnetostrictive member is replaced by a magnetic structure operated by the diaphragm which produces a varying magnetic field in the neighborhood of a coil fixed to the casing of the detonation meter pickup. Accordingly, the coil is stationary and is not subject to the mechanical vibrations which necessarily occur in varying the magnetic field in accordance with cylinder pressure variations. It is a feature of this invention that this desirable result is attained without changing the filter action of the magnetostrictive pickup, which has been accepted as standard by industry groups. That is, the filter characteristics of my improved pickup can be made identical with those of the magnetostrictive pickups heretofore utilized.

It is an object of the invention to provide an improved detonation meter pickup.

It is a further object to provide a pickup which is not subject to open circuiting of the coil resulting from mechanical stresses due to vibration of the pickup.

It is still a further object to provide a pickup which is reliable in operation, of durable construction, and which accurately reproduces the filter characteristics of pickups heretofore recognized as standard.

Figure 2:
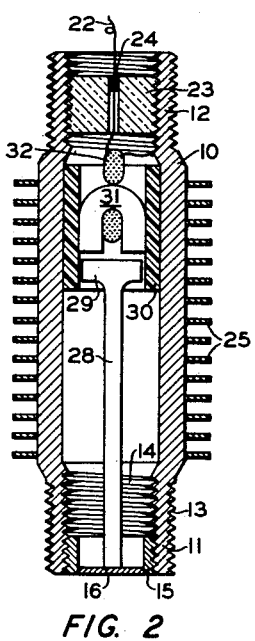
Figure 3:
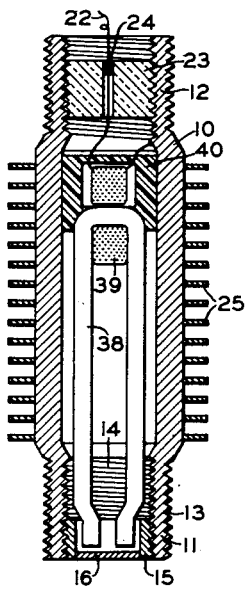
Figure 4:
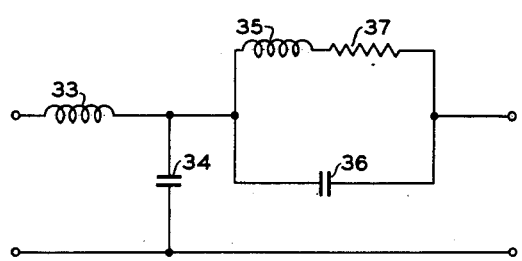

Various other objects, advantages and features of the invention will become apparent to those skilled in the art from the accompanying disclosure and drawings, in which:

Figures 1, 2 and 3 are vertical sectional views showing three modifications of the pickup constructed in accordance with the present invention; and Figure 4 is a schematic circuit diagram showing the equivalent electrical circuit of the mechanical parts of the pickup.

Referring now to the drawings in detail, and particularly to Figure 1, the pickup comprises a generally cylindrical metal casing 10 which is provided, at its lower end, with a threaded section 11 and, at its upper end, with a threaded section 12. Section 11 has external screw threads 13 which are adapted to fit within a bore in a cylinder of an internal combustion engine so that the lower part of the pickup is in direct communication with the interior of the cylinder under test. Alternatively, section 11 may be provided with a suitable mounting so that it can be attached directly to the engine block and thereby pick up the pressure variations resulting from operation of the engine. The section 11 is also provided with internal threads 14 for receiving an assembly consisting of an externally threaded cylindrical sleeve 15 having a diaphragm 16 secured to its lower end. This diaphragm is adapted to move responsive to pressure variations in the cylinder under test and this movement is transmitted to a longitudinally-extending rod 17 which has one end thereof secured directly to the diaphragm, as by brazing, and its other end secured to a U-shaped permanent magnet 18.

The magnet 18 is received within a sleeve 19 of insulating material which permits longitudinal movement of permanent magnet 18 but prevents transverse displacement thereof. A coil 20 of annular shape is mounted fixedly within the casing 10 by an insulating block 21, the axis of the coil being perpendicular to the longitudinal axis of the casing 10. The body of the coil 20 is mounted between the legs of permanent magnet 18 so that it is disposed within the field of the magnet. One terminal of the coil is connected directly to casing 10 and the other terminal is connected to a lead 22 which extends through a small opening in an annular member 23 which is threaded interiorly of the threaded section 12. The opening within annular member 23 may be sealed by insulating material 24 to prevent moisture from entering the interior of the casing.

Considerable heat is conducted to the casing 10 during operation of the pickup in testing an internal combustion engine. Accordingly, the casing is provided with a series of longitudinally spaced cooling fins 25 to aid in dissipating the heat conducted to the casing.

In the operation of the pickup, pressure variations within the engine cylinder are transmitted to diaphragm 16, rod 17, and permanent magnet 18. This movement of magnet 18 induces an electromotive force in coil 20 which is proportional to the rate at which the coil turns cut magnetic flux. In this manner, an electrical voltage is induced in the coil which is representative of the pressure variations adjacent diaphragm 16. It will be noted that the coil remains stationary and does not move in accordance with the diaphragm motion. As a result, failure of the pickup due to open circuiting of the coil is eliminated or greatly minimized.

In the modification shown by Figure 2, parts similar to those described in connection with Figure 1 are indicated by like reference characters. In this modification, a rod 28 is substituted for rod 17, this rod 28 having one end firmly secured to diaphragm 16 and having, at its other end, an enlarged portion 29 which fits within a sleeve 30 of insulating material, the sleeve permitting longitudinal movement of the rod but preventing any transverse displacement thereof.

A U-shaped permanent magnet 31 is fitted tightly within the sleeve 30 and both legs of the magnet 31 are closely spaced to the enlarged portion 29 of rod 28 so that each leg defines an air gap with the enlarged portion 29. A coil 32 is wound upon the central region of permanent magnet 31, the axis of the coil being perpendicular to the longitudinal axis of the casing 19. This coil is connected in the same manner as the coil 20 of Figure 1.

In the operation of the pickup shown by Figure 2, vibration of diaphragm 16 responsive to pressure changes in the internal combustion engine cylinder produces longitudinal movement of enlarged portion 29 relative to permanent magnet 31. The reluctance of the magnetic flux path between these parts is varied as the length of the air gap is changed, thereby producing a change of flux density and inducing an electromotive force in the coil which is representative of the pressure variations to which diaphragm 16 is exposed.

As previously stated, the pickups of the present invention are adapted to precisely duplicate the filter action of magnetostrictive type pickups, if desired. Such magnetostrictive pickups may be represented by the equivalent electrical circuit shown in Figure 4. The mass of the diaphragm and its spring constant constitute a low pass filter represented by inductance 33 and condenser 34. The magnetostrictive rod may be represented by a filter of the band elimination type, the inductance 35 representing the inertia of the rod, and the condenser 36 representing the spring constant of the rod. Frictional damping effects are represented by resistor 37. The mass and spring constant relationships of the pickups of Figures 1 and 2 may be adjusted so that they are similar to those of the magnetostrictive rod by utilizing a diaphragm of such mass and stiffness that it is represented by the same filter combination 33, 34 as that of the diaphragm of the magnetostrictive pickup. Similarly, the mass and stiffness of magnetic structure 17, 18 or 28, 29 may be chosen so as to duplicate the conditions represented by band pass filter 35, 36 and 37. Accordingly, the pickups of Figures 1 and 2 accurately reproduce the performance of the magnetostrictive type pickups without suffering the disadvantages resulting from frequent open-circuiting of the coil.

In the modification of Figure 3, where parts similar to those described in connection with Figures 1 and 2 are indicated by like reference characters, the rod attached to the diaphragm is eliminated and a permanent magnet 2 is utilized having elongated legs which are closely spaced to diaphragm 16, each leg defining an air gap with the diaphragm. A coil 39 is wound upon the central region of permanent magnet 38 and the assembly including the coil and magnet is supported in fixed position within the casing by a frame 40 of insulating material. In this modification, the movements of diaphragm 16 directly change the length of the air gaps between the diaphragm and the legs of the permanent magnet, thus varying the flux density in the region of coil 39 with the result that a voltage is induced therein which is representative of the movement of diaphragm 16. As in Figures 1 and 2, the coil assembly is stationary and, therefore, the danger of open-circuiting the coil is eliminated or greatly minimized. The electrical output of this pickup is a more exact reproduction of the pressure variations adjacent the diaphragm, since the rod 17 or 28 of Figures 1 and 2 is eliminated with resultant elimination of the band pass filter effect of components 35, 36 and 37, Figure 4. However, the pickup of Figure 3 does not reproduce the filter characteristics of magnetostrictive pickups, as do the modifications of Figures 1 and 2.

Where the pickup is of the type which is mounted directly on the engine block, diaphragm 16 may be replaced by a metal block having rod 17, Figure 1, or rod 28, Figure 2, secured thereto. If used with the embodiment of Figure 3, the legs of magnet 38 are closely spaced to the inner end of the block. In each case, pressure changes in the cylinder produce relative movement between the coil and magnet structure, thereby inducing a voltage representative of such pressure changes in the coil.

Due to the use of the stationary coil in all modifications of the present invention, a much longer life results than can be expected from magnetostrictive type pickups. The results from the fact that the coil is not subjected to the extremely rapid and complex vibrations of the diaphragm but only to the relatively small amplitude vibrations of the casing. Hence, open circuiting of the coil occurs with far less frequency.

While the invention has been described in connection with a present preferred embodiment thereof, it is to be understood that this description is illustrative only and is not intended to limit the invention, the scope of which is defined by the appended claims.

Having described my invention, I claim:

1. A detonation meter pickup comprising, in combination, an elongated casing, means for securing said casing to the cylinder of an internal combustion engine, a pressure sensitive diaphragm at one end of said casing, a generally cylindrical coil secured to said casing and having its axis perpendicular to the axis of said casing, a U-shaped permanent magnet having its legs mounted in encircling relation to said coil to produce a magnetic field in the region of said coil, a metal rod secured at one end to said magnet and at its other end to said diaphragm, and members of insulating material mounting said permanent magnet for longitudinal movement relative to the coil but preventing transverse movement thereof relative to the coil whereby movements of said diaphragm are transmitted to said magnet, thereby to vary said magnetic field in the region of said coil.

2. A detonation meter pickup comprising, in combination, an elongated generally cylindrical casing having an externally threaded portion of reduced diameter at one end thereof, a threaded generally cylindrical insert fitted within said reduced end portion, a pressure sensitive diaphragm supported by said insert in a plane perpendicular to the axis of said casing, a generally cylindrical coil secured to said casing and having its axis perpendicular to the axis of said casing, a U-shaped permanent magnet having its legs mounted in encircling relation to said coil to produce a magnetic field in the region of said coil, a metal rod secured at one end to said magnet and at its other end to said diaphragm, and members of insulating material mounting said magnet for longitudinal movement relative to the coil but preventing transverse movement thereof relative to the coil whereby movements of said diaphragm are transmitted to said magnet, thereby to vary said magnetic field in the region of said coil.

3. A detonation meter pickup comprising, in combination, an elongated casing, means for securing said casing to the cylinder of an internal combustion engine, a pressure sensitive diaphragm at one end of said casing, a generally cylindrical coil secured within the other end of said casing, a U-shaped permanent magnet having its legs mounted in encircling relation to said coil to produce a magnetic field in the region of said coil, a metal rod secured at one end thereof to said diaphragm and having, at the other end thereof, an enlarged portion closely spaced to the legs of said magnet, and guide means permitting longitudinal movement of said enlarged portion toward and away from the legs of said magnet but preventing transverse movement thereof.

4. A detonation meter pickup comprising, in combination, an elongated generally cylindrical casing having an externally threaded portion of reduced diameter at one end thereof, a threaded generally cylindrical insert fitted within said reduced end portion, a pressure sensitive diaphragm supported by said insert in a plane perpendicular to the axis of said casing, a generally cylindrical coil secured within the other end of said casing and having its axis perpendicular to the axis of said casing, a U-shaped permanent magnet havings its legs mounted in encircling relation to said coil to produce a magnetic field in the region of said coil, a metal rod secured at one end to said diaphragm and having an enlarged portion at its other end closely spaced to the legs of said magnet, and guide means mounting said enlarged portion for longitudinal movement relative to the legs of said magnet but preventing transverse movement thereof, whereby movements of said diaphragm are transmitted to said enlarged portion, thereby to vary the magnetic field in the region of said coil.

5. A detonation meter pickup comprising, in combination, an elongated casing, means for securing said casing to the cylinder of an internal combustion engine, a pressure sensitive diaphragm at one end of said casing, a coil spaced from said diaphragm and positioned adjacent the other end of said casing, means for establishing a magnetic field through the coil including a U-shaped permanent magnet having its legs mounted in encircling relation to the coil, said last-mentioned means providing a flux path for said magnetic field, an elongated metal rod having one end thereof secured to said diaphragm and having at its other end at least part of said means for establishing a magnetic field through the coil, and guide members constructed and arranged to permit longitudinal movement of said other end of the rod while preventing transverse movement thereof, said field varying in intensity responsive to movement of said diaphragm.

6. A detonation meter pickup comprising, in combination, an elongated generally cylindrical casing having an externally threaded portion of reduced diameter at one end thereof, a threaded generally cylindrical insert fitted within said reduced end portion, a pressure sensitive diaphragm supported by said insert in a plane perpendicular to the axis of said casing, a coil spaced from said diaphragm and positioned adjacent the other end of said casing, means for establishing a magnetic field through the coil incorporating a U-shaped magnet having its legs mounted in encircling relation to said coil, said last-mentioned means providing a flux path for said field, an elongated metal rod having one end thereof secured to said diaphragm and having at its other end at least part of said means for establishing a magnetic field, and guide members constructed and arranged to permit longitudinal movement of said other end of the rod while preventing transverse movement thereof, said field varying in intensity responsive to movement of said diaphragm.

MAX M. ADAMS.

References Cited in the file of this patent
UNITED STATES PATENTS

| Number | Name | Date |
| --- | --- | --- |
| 2,074,417 | Olsen | Mar. 23, 1937 |
| 2,269,760 | Eldredge | Jan. 13, 1942 |
| 2,319,219 | Draper et al. | May 18, 1943 |
| 2,396,703 | Kamler et al. | Mar. 19, 1946 |
| 2,414,457 | Eldredge et al. | Jan. 21, 1947 |
| 2,415,310 | Summerville et al. | Feb. 4, 1947 |
| 2,428,234 | Mapp | Sept. 30, 1947 |